March 13, 1928.  W. G. DUNN  1,662,261
AWNING STRUCTURE
Filed Aug. 1, 1927
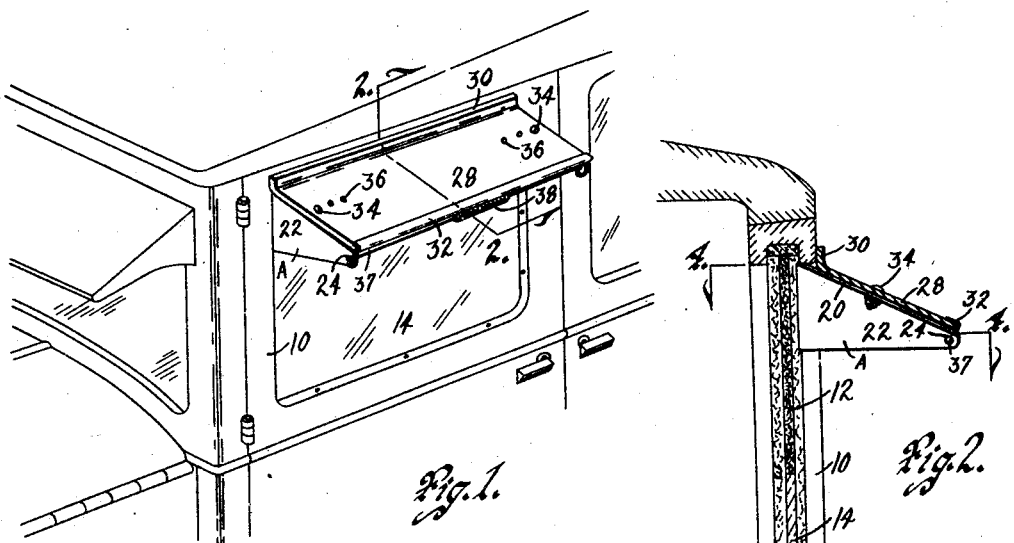
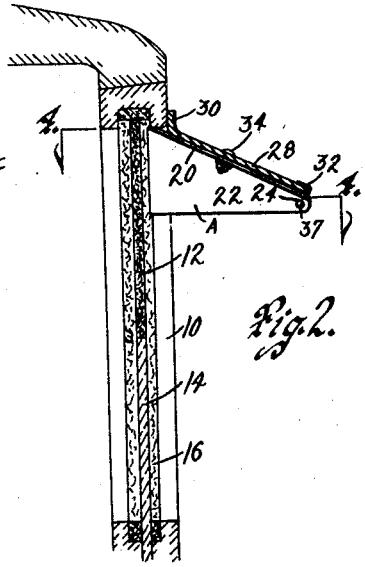
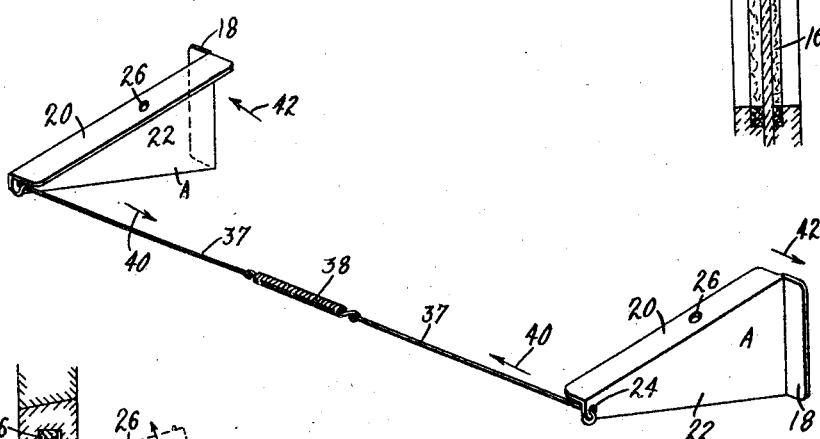
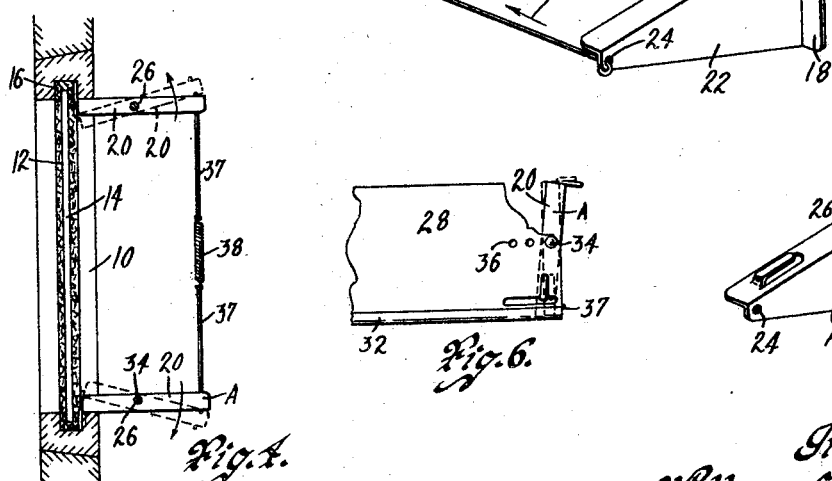
Witness
L. F. Sandberg
Inventor
William G. Dunn
by Bair & Freeman Attorneys Patented Mar. 13, 1928.

1,662,261

UNITED STATES PATENT OFFICE.

WILLIAM G. DUNN, OF CLARINDA, IOWA.

AWNING STRUCTURE.

Application filed August 1, 1927. Serial No. 209,833.

The object of my invention is to provide an awning structure of simple, durable, and comparatively inexpensive construction.

More particularly it is my object to provide an awning structure wherein a sheet of semi-rigid material may serve as the awning portion of the structure and is retained upon the automobile by a pair of brackets pivotally mounted relative to the awning portion and arranged when placed under tension to coact with the window channels of the automobile for retaining the entire awning structure in installed position.

Still a further object is to provide a pair of brackets arranged to support an awning and capable of pivotal movement relative to the awning whereby when one of the ends of each of the brackets is drawn towards each other the other ends of the brackets will be forced outwardly, the awning serving as the fulcrum upon which the bracket members pivot.

Still another object is to provide upon each bracket a narrow blade or flange adapted to project into the window channels of an automobile window frame wherein the brackets may be retained in position for supporting an awning.

Still a further object is to provide a clip or tongue upon each of the brackets adapted to project through the awning portion for fastening the awning portion to the brackets and yet allowing free pivotal movement of the brackets relative to the awning proper.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Figure 1 is a perspective view of a portion of an automobile with my improved awning structure shown thereon.

Figure 2 is a sectional view taken on the line 2—2 of Figure 1.

Figure 3 is a perspective view of the brackets and yielding connection between the brackets of my awning structure.

Figure 4 is a sectional view taken on the line 4—4 of Figure 2, the dotted lines indicating the position of the brackets before being installed upon the automobile.

Figure 5 is a perspective view of a slightly modified form of bracket wherein additional fastening means between the awning portion and the bracket is provided; and Figure 6 is a fragmentary view of the awning portion and bracket connected thereto.

In the accompanying drawings I have used the reference numeral 10 to indicate generally an automobile door or window frame having window channels or grooves 12 arranged therein. A glass 14 is slidably mounted within the window groove 12. Surrounding the edge of the glass 14 and received within the window grooves 12 is a channel shaped felt packing 16. My improved awning structure is arranged to have parts extend into the window grooves 12 between the felt 16 and the frame 10. The parts of the awning structure which project into the window grooves 12 are very narrow or thin and do not interfere with the opening or closing of the window 14. My awning structure includes a pair of brackets A preferably formed of sheet metal. The brackets A are substantially triangular in outline and are each formed with an out-turned flange 18 along one of its sides and with an in-turned flange 20 upon another of its sides. The brackets A have a body portion 22 formed with small eyelets or openings 24. The eyelets 24 are formed in the brackets A in the corner opposite from the flange 18.

Each of the flanges 20 are formed with small openings 26. The flanges 20 serve to support an awning portion 28 of my entire awning structure. The awning portion 28 is in sheet form and has an upturned flange 30 along one of its marginal edges which flange 30 is arranged to abut against the upper cross member of the door or window frame 10 of the automobile. The awning portion 28 is self sustained—that is, it is formed of semi-rigid material and has sufficient body to maintain its own weight and to resist wind pressure when installed upon an automobile and in use.

The outer and lower marginal edges of the sheet 28 may be formed with a binder strip 32 of any suitable kind. The awning portion 28 is arranged to rest upon the flanges 20 and to be pivotally secured to the brackets A by means of bolts or the like 34 arranged to project through openings 36 formed in the awning portion 28 and through the openings 26 in the flanges 20. The awning portion 28 may be arranged with a plurality of openings whereby the position of the brackets A relative to the awning portion 28 may be varied as desired and as necessary to accommodate window frames of various sizes.

It will be noted that the brackets A when connected to the awning portion 28 are capable of pivotal movement with the bolts 34 as the axis for such pivotal movement. The two brackets A are connected together by wires 37 extending through the eyes 24. The wires are in turn connected together by a coil spring 38.

It will be noted that the tendency of the coil spring 38 is to draw the outer ends of the brackets A towards each other in the direction indicated by the arrows 40. The awning portion 28 when the brackets are connected thereto serves to space and position the pivotal points of the brackets A with the result that the flanges 18 on the brackets A are forced apart and tend to move in the direction indicated by the arrows 42. When the awning structure is to be attached to a window frame, it is necessary to swing the brackets A to the position shown in dotted lines in Figure 4 of the drawings against the tension of the coil spring 38. The flanges 18 will project into the window grooves 12 and the brackets will then assume the position shown in solid lines in Figure 4 of the drawings. The tension of the spring 38 forces the flanges 18 outwardly and into the window grooves for frictionally supporting the entire awning structure upon the window frame.

In order to prevent the awning portion 28 from being blown upwardly at its lower portion I provide an upstruck tongue 44 as shown in Figure 5 of the drawings which extends through an elongated slot 46 formed in the awning portion 28. The slot 46 is of sufficient length and sufficient width to permit the necessary pivotal movement of the brackets A without interference. The tongue 44 is of sufficient length so that it extends over a portion of the awning 28 at all times regardless of the position of the bracket A and regardless of which one of the openings 36 is being used for pivotally connecting the bracket A to the awning portion 28.

It will be noted that my awning is adjustable and that various widths of window frames may be taken care of by simply adjusting the position of the brackets A relative to the awning portion 28. The awning portion in addition to being secured to the brackets A by the bolts 34 may be secured and retained by the use of the slot and tongue connections 44 and 46.

Some changes may be made in the details of the construction and arrangement of the device without departing from the essential principles of structure involved therein, and it is my intention to cover by my claims, any modified forms of structure or use of mechanical equivalents, which may be reasonably included within their scope.

I claim as my invention:

1. An awning structure including a sheet of awning material, a pair of supporting brackets pivotally connected to said sheet, tension means connecting said brackets together and tending to swing them upon their pivots, flanges formed on said brackets on the side opposite said tension means whereby the flanges are moved away from each other when the tension means is effective.

2. An awning structure including a sheet of awning material, a pair of supporting brackets pivotally connected to said sheet, tension means connecting said brackets together and tending to swing them upon their pivots, means for coacting with a window frame formed on said brackets and positioned on one side of said pivots, said tension means being on the opposite side of said pivots.

3. An awning structure including a sheet of substantially rigid awning material, a pair of supporting brackets pivotally connected to said sheet, tension means connecting said brackets together and tending to swing them upon their pivots, means for coacting with a window frame formed on said brackets and positioned on one side of said pivots, said tension means being on the opposite side of said pivots, the parts being so arranged that the tension means serves to force said brackets on one side of the pivot away from each other and draw the other sides toward each other.

4. In an awning structure an awning body of self sustaining form, a pair of brackets having parts for engagement with a window frame, pivotal connections between said body and said brackets, tension means connecting the ends of said brackets opposite said parts for swinging said brackets upon their connections and causing said parts to frictionally engage a window frame.

5. In an awning structure an awning body of self sustaining form, a pair of brackets having parts for engagement with a window frame, pivotal connections between said body and said brackets and means for pivotally moving said brackets on their connections, said pivotal connection serving as fastenings between said brackets and said awning body and additional fastenings between said brackets and said body, said last fastenings including slot and tongue connections.

6. In an awning structure, a body, detachable mounting brackets pivoted to the respective ends of said body, said brackets having outstanding flanges for entering the channels of a window frame and capable of rotary movement about said pivots in planes parallel with that of the body when tension is applied to move said flanges apart and into said channels, and yielding means for applying tension to produce a rotary movement of brackets about said pivots for holding the flanges in the channels.

7. In an awning structure, an awning body of self-sustaining form, a pair of brackets having parts adapted for engagement with a window frame, pivotal connections between said body and said brackets for allowing movement of the brackets in planes parallel with that of the body, means tending to move said brackets on their pivots for holding said frame engaging parts in frame engaging positions.

8. In an awning structure, an awning body of self-sustaining form, a pair of brackets having parts arranged in one plane for engagement with a window frame and portions inclined from said first parts, means for pivotally connecting said portions with said awning body adjacent to the ends of the body, and yielding means tending to swing said brackets on their pivots for moving said parts away from the body into position for engaging with a window frame.

Des Moines, Iowa, July 25, 1927.

WILLIAM G. DUNN.